United States Patent [19]

Lorraine

[11] 4,371,322
[45] Feb. 1, 1983

[54] COMBINATION AIR PUMP AND AIR FILTER

[75] Inventor: Jack R. Lorraine, Yorktown, Va.

[73] Assignee: The Bendix Corporation, Southfield, Mich.

[21] Appl. No.: 191,731

[22] Filed: Sep. 29, 1980

[51] Int. Cl.³ .................. F04C 15/02; B01D 46/10
[52] U.S. Cl. ........................... 418/47; 417/313;
 55/385 B; 55/469; 55/482; 55/489; 55/507
[58] Field of Search ............... 55/1, 97, 317, 323,
 55/385 B, 467, 469, 482, 487–489, 505–507,
 524, DIG. 19; 210/459, 488, 506–508; 417/312,
 362, 313; 418/47

[56] References Cited

U.S. PATENT DOCUMENTS

| | | | |
|---|---|---|---|
| 2,135,100 | 11/1938 | Campbell | 55/487 |
| 2,565,764 | 8/1951 | Flanagan | 55/467 |
| 2,678,156 | 5/1954 | Henderson | 418/47 |
| 2,954,786 | 10/1960 | Lebert | 55/482 |
| 3,073,735 | 1/1963 | Till et al. | 210/506 |
| 3,111,259 | 11/1963 | Demay | 417/362 |
| 3,204,395 | 9/1965 | Howard | 55/505 |
| 4,103,590 | 8/1978 | Pott | 55/309 |
| 4,196,027 | 4/1980 | Walker et al. | 55/524 |

FOREIGN PATENT DOCUMENTS 270691 8/1970 U.S.S.R. .................. 55/97

*Primary Examiner*—David L. Lacey
*Attorney, Agent, or Firm*—Russel C. Wells

[57] ABSTRACT

A two stage air filter adapted for use on an air pump as used in a motor vehicle for emission requirements, has a cylindrical, coarse filter element mounted along one end to a broadside of a thin, rigid baffle plate and a cylindrical, fine filter element mounted along one end to the other broadside of the baffle plate. The baffle plate cooperates with the end bell of the air pump to snappingly retain the filter in the pump and to compressingly hold the fine filter element inside the end bell.

7 Claims, 6 Drawing Figures

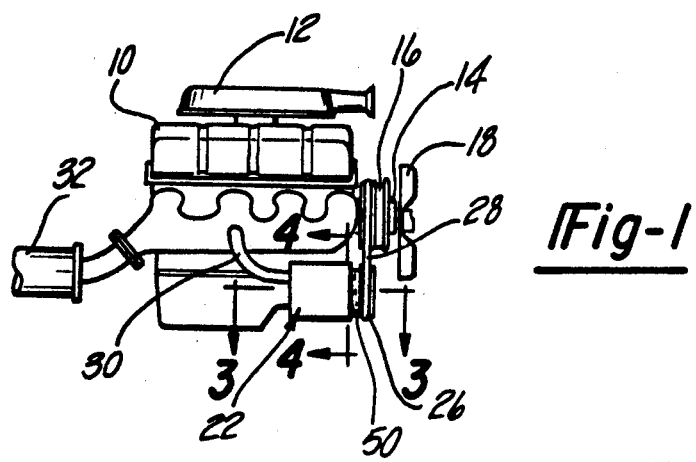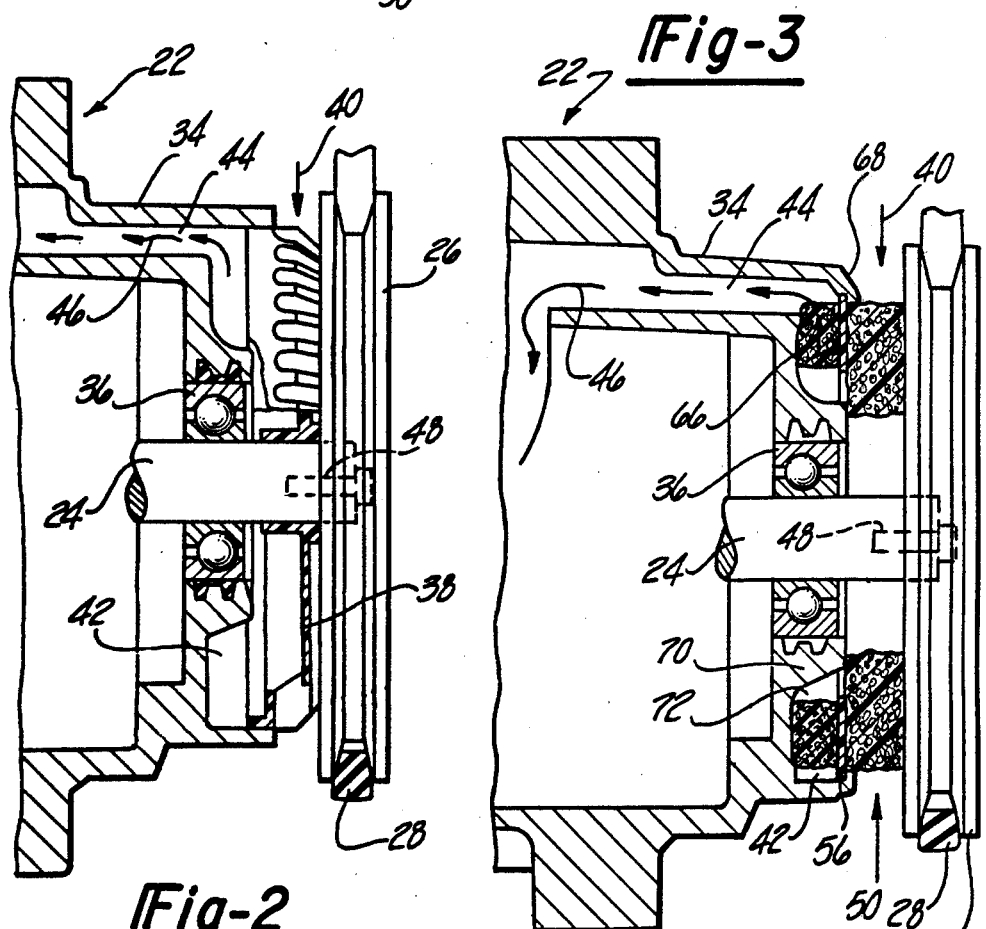

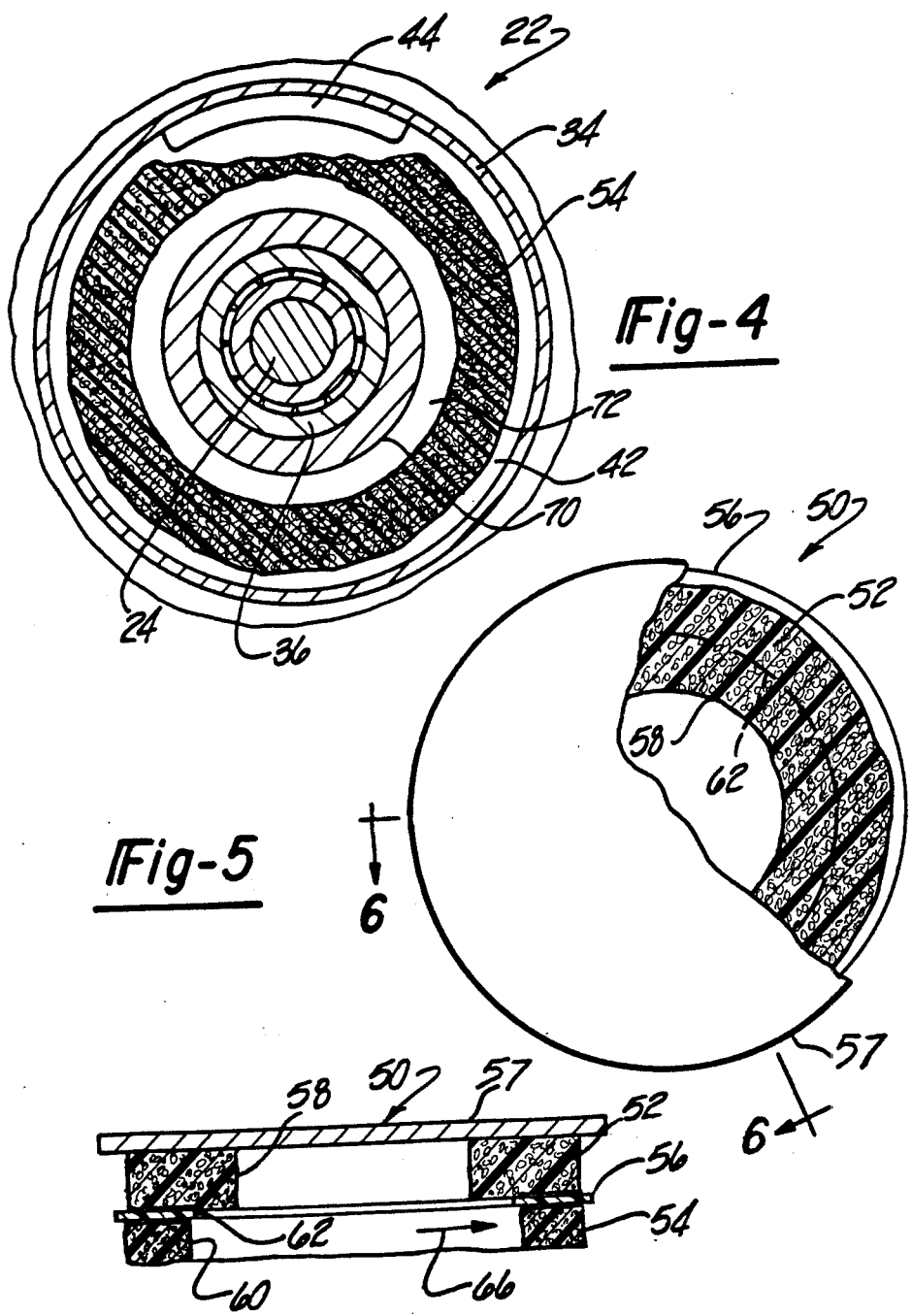

COMBINATION AIR PUMP AND AIR FILTER

This invention relates in general to filters and in particular to a two-stage filter for a motor vehicle air pump.

In order to control engine emissions of motor vehicles it has been necessary to add an air pump to the vehicle which forces outside ambient air into the exhaust system in order to complete combustion. Typically, the air pump is driven by belt from the main engine shaft of the engine and is therefore located in the engine compartment. The pump receives along with the ambient air large foreign particles such as stones, dirt, grit, etc., and in addition liquids such as water. If a stone or grit gets into the rotary mechanism of the pump it will cause premature wear on the pump and ultimately the pump must be replaced. It has been found that if water goes into the pump while the pump is running there is sufficient heat in the pump to evaporate it but, if water gets into the pump, as it typically will do when the pump is not running, it will cause corrosion and the pump must be replaced.

In order to avoid the problems caused by large particles and water getting into the pump, several motor vehicle manufacturers have resorted to a system of pipes and tubing for receiving air from the air cleaner and piping the air directly to the inlet of the pump. This prevents larger particles such as stones and grit and water from getting into the pump. This solution is very expensive.

Another prior art solution which is found in many U.S. vehicles is a dynamic air filter. This filter is a counter-rotating vane filter which has a plurality of vanes so designed that they are rotating against the air flow and thereby the vanes are repelling any stones or grit that is in the air stream. In addition, the vanes tend to repel any water that is splashed on the air pump when the pump is rotating, however this action atomizes the water and therefore some of the atomized water will be carried by the air into the pump. Since the vanes define large apertures in the filter, stones, on occasion, do enter the apertures and from there move into the interior of the pump causing wear of the pump. In addition, when the pump is not moving, the vanes form a funnel-like arrangement collecting water and directing it into the pump.

It is the principal object of this invention to provide a filter which will reject large particles such as grit and stones from passing therethrough. It is an additional object of this invention to provide a filter which will reject the flow of liquids in an air stream.

These and other objects of the invention are accomplished by means of a two-stage, cylindrical filter wherein the first stage is a cylindrical, coarse filter element which is operative to receive the air to be filtered. The porosity index of this element is low therefore providing somewhat minimal obstruction to the flow of air through the filter and maximum obstruction to large particles. The next stage filter element is a fine filter element having a relatively high porosity index relative to the first stage filter element. This fine filter element is doughnut-shaped and by means of a baffle plate positioned between the two filter elements the air flow is directed from the coarse filter element into the cylindrical side surface of the aperture in the fine filter element. The baffle plate also provides a platform for respectively supporting the filter elements on either broadside thereof and functions to retain the filter in the pump.

DESCRIPTION OF THE DRAWINGS

In the drawings:

FIG. 1 is a schematical representation of an engine compartment of a motor vehicle showing a typical relationship of an air pump to the engine.

FIG. 2 is a sectional view through an air pump showing the prior art filter element.

FIG. 3 is a sectional view along line 3—3 of FIG. 1 illustrating the static filter element of the present invention.

FIG. 4 is a sectional view taken along line 4—4 in FIG. 1.

FIG. 5 is a plan view of the static filter element.

FIG. 6 is a sectional view taken along line 6—6 of FIG. 5.

DETAILED DESCRIPTION

Referring to the figures by characters of reference there is illustrated in FIG. 1 a schematic view of the engine compartment of a motor vehicle having an engine 10, an air cleaner 12, an engine shaft or crank shaft 14, a drive pulley 16 and a fan 18. Positioned rearward of the fan and mounted to the crank shaft 14, is the drive pulley 16 for the air pump 22. Connected to a rotor shaft 24 of the air pump 22 is a driven pulley 26 which is connected by means of a belt 28 to the drive pulley 16. The output air from the air pump 22 is direct by means of a pipe 30 to the exhaust system 32 of the engine 10. Ambient air enters the air pump 22 rearward of the driven pulley 26 and is exhausted from the air pump through the pipe 30 to the exhaust system 32.

Referring to FIG. 2 there is shown the end bell 34 of the air pump 22 illustrating the rotor shaft 24 mounted in a bearing 36 contained in the end bell. The rotor shaft extends from the end bell of the pump and mounted thereto by at least one threaded means 48 is the prior art dynamic filter element 38 which is positioned in the space between the pulley 26 and end bell 34. Typically the dynamic filter 38 substantially fills the space between the inside face of the driven pulley 26 and the end bell 34. In this example the air flows in the direction of the arrow 40 into the dynamic filter 38, into an annular chamber 42 and then into an inlet port 44. In the air pump 22, the inlet port 44 is typically along one small angular segment (FIG. 4) of the end bell 34 and extends from the pulley end of the end bell back into the interior of the air pump 22. The air flows in the direction of the arrows 46 in the inlet port to the outer periphery of the rotor (not shown) of the air pump.

Referring to FIG. 3 there is shown the preferred embodiment of the two-stage static filter 50 according to the present invention. The difference between FIG. 2 and FIG. 3 is the filters with all other parts being identical and having the same reference characters. The static filter 50 is mounted in the end bell 34 so as not to rotate with the rotor shaft 24 but receives air in the direction of arrow 40 into the air pump.

Referring to FIG. 5 there is shown a plan view of the preferred embodiment of the two-stage filter 50 as viewed from the first or coarse filter element 52 with the second plate member 57 broken away. The filter comprises two filter elements 52 and 54 mounted or bonded by bonding means to the broadsides of a thin, rigid baffle plate 56 and having a second plate member 57 forming an obstruction to the flow of air in an axial direction into the coarse filter element 52.

The first stage or coarse filter element 52 is a large cell filter which, in the preferred embodiment, is cylindrical in shape having a center aperture 58 of sufficient size so as not to interfere with the rotation of the rotor 24, but as shown in FIG. 3 fills the space between the inside face of the driven pulley 26 and the end bell 34. The coarse filter element 52 is fabricated from polyurethane reticulated foam having a porosity index of ten with a tolerance on the index of plus or minus five. Due to the large interconnecting cells of this filter, air will flow through the filter but the filter will reject large air particles including stones and will separate liquids such as water from the air inasmuch as there is no direct path through the filter.

The second stage or fine filter element 54 is a small cell, fine filter which likewise is cylindrical in shape and has an aperture 60 therein which aperture is greater size than the aperture 58 of the coarse filter element 52. This filter element 54 is fabricated from a polyurethane reticulated foam having a porosity index of forty with a tolerance of plus or minus five.

The baffle plate 56 is a thin, rigid member which functions to support the coarse filter element 52 on one side thereof and the fine filter element 54 on the other side thereof. The baffle plate 56 likewise has an aperture 62 axially located therein which aperture has a size intermediate the size of the apertures in the two filter elements 52 and 54. The aperture 62 in the baffle plate 56 must be smaller than the aperture 60 in the fine filter element 54 but greater than the aperture 58 in the coarse filter element 52. In this manner the baffle plate directs air from the coarse filter element 52 through its aperture 62 and into the side surface of the aperture 60 of the fine filter element 54. The air flows through the fine filter element 54 in the direction of the arrow 66 to the inlet port 44. As illustrated in FIG. 3 the baffle plate 56 and the fine filter element 54 cooperate with the retaining means 68 on the end of the end bell 34 to snappingly hold the static filter 50 in the air pump 22.

One of the functions of the baffle plate 56 is to seal the filter 50 in the end bell 34 by means of an interference fit between the baffle plate 56 and the retaining means 68 of the end bell 34. The baffle plate 56 is snapped into the end bell 34 and is held in placed by the retaining means 68 and the compression of the fine resilient filter element 54.

As illustrated in FIG. 3, the direction of air flow into the static filter 50 is in the direction of the arrow 40. A second plate member or the driven pulley 26 also functions to prevent any large particles from attempting to enter the filter along the axis of the air pump 22. The air flows in the direction of the arrow 40 radially inward through the coarse filter element 54 and into its aperture 58. The aperture 60 in the fine filter element 54 is larger than the mounting hub 70 holding the bearing 36 in the end bell 34 thereby providing cavities 42 and 72 on both sides of the filter element 54 as shown in FIG. 3. Thus, the air flows from the course filter element 52, around the baffle plate 56, into the annular cavity 72, through the fine filter element 54 and into the annular cavity 42 to the inlet port 44 and from there onto the periphery of the rotor.

During the life of the air pump 22 as the fine filter element 54 becomes clogged in annular segments thereof, the amount of air flowing into the pump will remain the same but will constantly seek the cleanest filter path through the filter. When the filter becomes clogged it is easily replaced. As shown in FIG. 3 replacement of the static filter 50 is accomplished by the removal of the driven pulley 26 through the threaded means 48 and then the static filter 50 is snappingly removed from the end bell 34.

Thus it can be seen that the static filter 50 will functionally operate to reject large particles such as stones and grit from coming into the filter in the direction of the air flow 40. By selecting the porosity indexes of the two filter elements as previously stated, particles of 1,000 microns and larger will be retained by the two filter elements and will not enter into the inlet cavity 44 of the air pump 22 to cause damage to the air pump.

Referring again to FIG. 1 the axis of the air pump 22 mounts substantially parallel to the axis of the engine or horizontal to the ground and thus water can be splashed on the air pump 22. The coarse cell structure of the first filter element 52 is selected for its ability to dissipate the initial energy of the water and to allow the water to flow by gravity to the lowest point of the filter where vehicle and engine vibration will shake it free from the filter. Also because of the coarse cell structure, the surface tension or capillary action of the water will tend to keep it in the filter as it drains and will not allow the water to enter the air pump. In addition, the baffle plate 56 will prevent the water from axially transferring from the coarse filter element 52 to the fine filter element 54. Further, the cell size of the coarse filter element 52 is large enough to prevent the filter element 54 from acting as a sponge to hold the water. Thus, it can be readily seen that by the proper selection of the cell size of the coarse filter 52, the material of the baffle plate 56 and the size of the aperture 62 in the baffle plate, water entering the filter 50 from any direction will have to flow against gravity to go over the barrier formed by the baffle plate into the rotor area of the air pump instead of flowing by gravity water to the lowest point of the static filter to be removed therefrom.

In the preferred embodiment, the coarse filter element 52 has an aperture 58 therein, however, it can be readily appreciated that such an aperture is not necessary if there is no rotating member extending through the filter. Thus, the filter element 52 may be a cylindrical element without an aperture therein. In such a situation the aperture 62 in the baffle plate 56 controls the flow of air into the side surfaces of the aperture 60 of the cylindrical, fine filter element 54.

There has thus been shown and described a static filter as may be adapted to air pumps for motor vehicles. Inasmuch as the inlet port 44 of the air pump 22 is only along a portion of the periphery of the rotor as illustrated in FIG. 4, the life of the static filter is extended. The static filter element 50, shown as a two stage filter element, may have additional stages added thereto, each with a sufficiently smaller porosity index to reduce the size of the particles allowed to flow through the filter. Since the air is being pulled into the pump through the inlet port 44 by means of the rotor, the air will typically take the shortest distance from outside the pump into the inlet port 44. Thus, as each angular segment of the filter elements become clogged, the air will then search in a radial direction from the rotor shaft until it finds a nonobstructed section of the filter to go through, thus the life of the filter is extended as the full cylindrical surface of the filter elements are used.

Having thus described a static air filter what is claimed is:

1. A combination of a filter and an air pump, the air pump having an end bell adapted to receive air into the pump in an area around the axis of the pump and direct flow of the ingested air to a point about the periphery of the pump rotor in said pump, the combination comprising:

- a coarse, cylindrical filter element for receiving air and adapted to prevent the passage of large particles therethrough;
- a fine, resilient, cylindrical filter element concentric with said coarse filter element for receiving air therefrom and delivering air to the pump rotor along a portion of its outer peripheral surface;
- a thin, rigid plate member interposed said coarse and fine filter elements and having an aperture therein for directing the air flow from said coarse filter element to said fine filter element;
- bonding means for securing said coarse and fine filter elements to opposite sides of said plate member; and
- retaining means on the end bell of the pump for snappingly engaging said plate member and cooperating with the compression of said fine filter element to retain said plate member in the end bell with said coarse filter member extending therefrom.

2. The combination according to claim 1 wherein said coarse and fine filter elements each have an aperture located coaxially with said aperture in said thin, rigid plate member and including a second plate member positioned outwardly of said coarse filter member and operable to at least form an obstruction to the flow of air in an axial direction into said coarse filter.

3. The combination according to claim 2 wherein the size of said aperture of said fine filter element is greater than the size of the apertures of said thin, rigid plate member and said coarse filter element whereby air flows from said coarse element into the cylindrical side surface of said aperture of said fine filter element.

4. The combination according to claim 1 wherein said pump includes a pulley for coupling the pump to a source of power for operating the air pump, said pulley is operatively connected to the pump rotor and positioned outwardly of said coarse filter element.

5. The combination according to claim 1 wherein said coarse filter element has a porosity index between 5 and 15.

6. The combination according to claim 1 wherein the porosity index of said fine filter element is at least three times the porosity index of said coarse filter element.

7. A combination of a filter in an air pump for a motor vehicle having a rotor shaft extending outward from the end bell of the pump and a pulley attached to the outward end of the rotor shaft and adapted to be driven by a belt means from a rotating shaft of the motor vehicle, the combination comprising:

- a non-rotating filter supported by retaining means in the end bell and partially extending outwardly of the end bell and substantially filling the space interposed the end bell and the pulley, said non-rotating filter having:
  - a cylindrical, coarse filter element having at least one flat end surface and an axially located cylindrically-shaped aperture therein;
  - a cylindrical, fine filter element having at least one flat end surface and an axially located cylindrically-shaped aperture therein, said aperture being larger than said aperture of said coarse filter element; and
  - a thin, rigid baffle member bonded along each broadside to said at least one flat end surfaces of each of said coarse and fine filter elements and having an axially located aperture therein smaller than said aperture of said fine filter element and said member snappably engaged with the retaining means in the end bell for compressively holding said fine filter member in the end bell.

* * * * *